United States Patent [19]

Trumble et al.

[11] 4,392,014
[45] Jul. 5, 1983

[54] TELEPHONE CABLE SPLICES

[75] Inventors: William P. Trumble, Kanata; Roger C. Finn; Charles F. C. Jackson, both of Ottawa, all of Canada

[73] Assignee: Northern Telecom Limited, Montreal, Canada

[21] Appl. No.: 255,781

[22] Filed: Apr. 20, 1981

[51] Int. Cl.³ .......................................... H02G 15/113
[52] U.S. Cl. ...................................... 174/92; 156/49; 174/76
[58] Field of Search ................... 174/92, 93, 76, 84 R, 174/88 R; 156/49

[56] References Cited

U.S. PATENT DOCUMENTS

| | | | |
|---|---|---|---|
| 3,836,694 | 9/1974 | Kapell | 174/92 X |
| 3,895,180 | 7/1975 | Plummer | 174/92 |
| 3,896,260 | 7/1975 | Plummer | 174/92 |
| 3,902,006 | 8/1975 | Gouteron et al. | 174/76 X |
| 3,955,043 | 5/1976 | Palmer et al. | 174/92 X |

Primary Examiner—A. T. Grimley
Assistant Examiner—D. A. Tone
Attorney, Agent, or Firm—Stuart L. Wilkinson

[57] ABSTRACT

A splice between ends of a pair of telecommunications cables is encapsulated in a thermoset foam. To encapsulate the splice it is positioned within a mold with the cables extending through apertures in the mold. At the apertures the cables are wrapped with an open cell foam material to block the cavity ends. A foam base material is then mixed with an activating agent which includes both a heat activated blowing agent and a material which reacts exothermically with the foam base material. The mixture is deposited within the mold and the mold closed. The mixture then foams to fill the mold and rapidly cures. The resulting joint is light, durable, waterproof and re-enterable.

7 Claims, 3 Drawing Figures

TELEPHONE CABLE SPLICES

This invention relates to a method for making a closure for buried telephone cable splices and to an encapsulated splice produced by the method.

In the installation, extension or repair of telephone cables, there is frequently a need to splice individual conductors of one cable to conductors of another, contiguous cable. In order to protect the conductors and connectors at the splice site from water and other contaminants, the spliced conductors must be encapsulated or otherwise protected.

In one known encapsulating technique, a thermosetting elastomer is used. After splicing the conductors, adhesive tape is wound onto the cable ends to form rigid collars and a mold is positioned to extend between the collars and surround the splice site. Unreacted thermosetting elastomer is then injected into the mold cavity and is allowed to cure. The amount of encapsulant used makes this technique expensive and operation time is long since elastomers having desired encapsulation properties are slow curing. Moreover the encapsulated joint produced is heavy and difficult to re-enter since the elastomer fuses with the material of both the cable sheath and insulation surrounding individual conductors of the cables.

Another protective covering technique uses heatshrink, a plastic material that has been rendered dimensionally unstable during manufacture. A tube of heatshrink surrounding a splice site shrinks appreciably to tightly embrace the underlying joint when heated by a torch. Although splice closure is achieved very quickly using heatshrink, it is a relatively expensive material and requires the use of an open flame which is not desirable if splice closure is taking place in a duct where gaseous build-up can occur. Moreover, although providing excellent radial protection for the joint, a heatshrink tube does not prevent water from seeping towards the splice site along the interior of one or other of the cables. Finally, the technique is somewhat craft sensitive and produces a joint which is not as physically durable as might be desired.

A technique is now proposed which overcomes these problems of known closures.

According to one aspect of the invention there is provided a method of protecting a telephone cable splice comprising disposing a mold around the splice and around ends of cables joined at the splice, blocking ends of the mold where the cable ends enter the mold thereby to define a mold cavity, and depositing within the mold cavity a thermosetting foam base material mixed with an activating agent to stimulate the foam base material to undergo a foaming action and thereby fill the mold cavity with a closed cell foam.

For a butt splice the connections can be encased in a grease filled bag and the splice wound with a protective film of material before being encapsulated within the foam. For a through splice, the foam is allowed to set directly in contact with the exposed conductors and connectors. The activating agent preferably includes a first material to promote an exothermic reaction with the foam base material and a blowing agent to produce a gas in response to said exothermic reaction. The base material and the activating agent are thoroughly mixed in order to prevent large voids and unreacted sections in the thermoset foam. The ends of the mold at which cable entry occurs are preferably blocked with a flexible, open cell foam material which permits venting of pressure built up by the expanding foam and also serves to create a skin by puncturing the cells of the expanding foam at the boundary thereof. The foam can also deform to accommodate any excess encapsulant in the mold.

According to another aspect of the invention there is provided a closure for a telephone cable splice, the splice and end portions of cables extending from the splice being encapsulated within a closed cell plastics foam.

The foam is preferably formed within a mold of, for example, a copolymer of polyethylene and polypropylene. The mold can have a cylindrical body portion and truncated end zones apertured for cable entry. The mold can be a multiple-part structure hinged in a longitudinal plane.

An embodiment of the invention will now be described by way of example with reference to the accompanying drawings in which.

Figure 1:
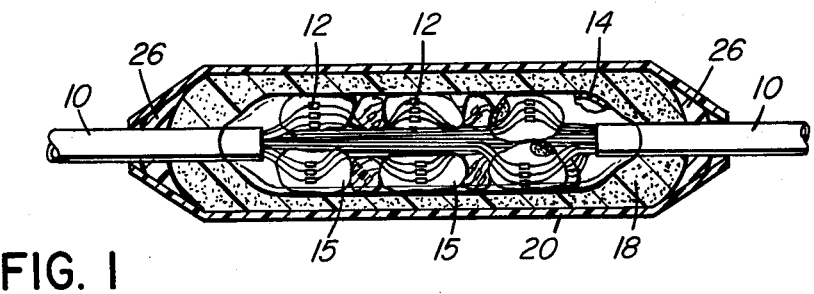
FIG. 1 is a longitudinal sectional view through an encapsulated splice according to the invention.

Referring in detail to the drawings, FIG. 1 shows in longitudinal cross-section, a pair of cables 10, individual conductors of which are spliced to one another by connectors 12. Groups of connectors are tied into grease filled bags for connector protection. At a central zone of the splice, the connectors and conductor ends are wrapped in a polyethylene film 14. The polyethylene film 14 is itself surrounded by a mass of closed cell thermoset foam 18 housed within a medium density polyethylene polypropylene copolymer mold 20. The mold has a cylindrical central zone 22 and truncated conical end zones 24 allowing cable entry. The thermoset foam 18 is confined at the ends of the molds 20 by collars 26 of open cell foam material such as polyurethane.

Figure 2:
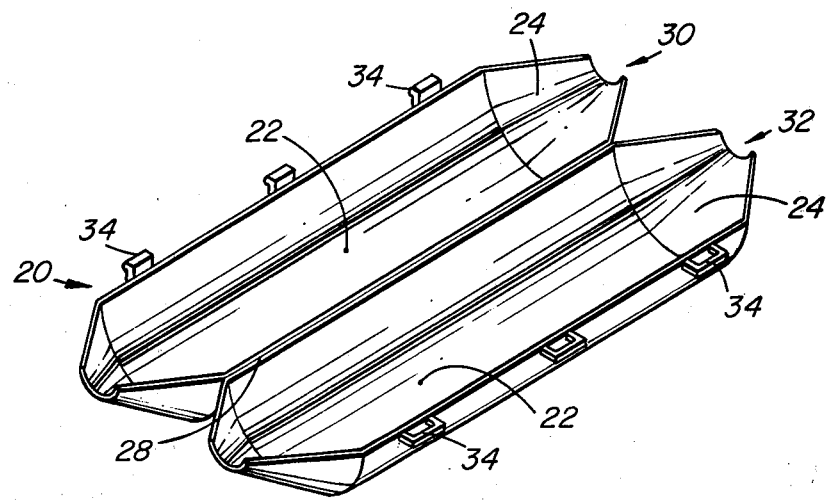
FIG. 2 is a perspective view of a mold housing for use in the closure method of the invention.

In order to effect encapsulation of a splice, connector groups are initially manually inserted into grease filled bags and the central splice zone is wound with a film of polyethylene which adheres to and beds down against the spliced conductors. Onto the sheath cable ends is then wound a collar 26 of a highly flexible, open cell polyurethane foam tape having an adhesive backing. The size of collar 26 depends on the size of mold which is to encapsulate the splice. The collar 26 has a radial extent sufficient to contact the mold wall in the end zones but will not be so large that it has to be appreciably compressed in order that it will fit into the mold. As shown in FIG. 2 the mold 20 is hinged into two parts 30 and 32 at an elongate weakened zone 28 in the mold wall. The splice is layed into the bottom part 30 of the mold so that the splice is located in the central zone 22 and the cable ends are located in the end zones 24. For a mold having a mold cavity 2000 cm$^3$ in volume, 125 gm of a polymeric isocyanate foam base material is thoroughly mixed for several minutes with 177 gm of an activating agent consisting of a high molecular weight polyol. One or both of the reactants also contains a blowing agent such as a freon. These materials are available from Biwax Corporation of the United States. Once mixing is complete, the mixture is immediately poured into the mold part 30 and the mold parts 30 and 32 are fastened together by integrally molded clip formations 34 along the two outer edges of the mold part. Within a few seconds of mixing the base material and the activating agent, an exothermic reaction occurs and the mixture begins to foam as the blowing agent undergoes a phase change from liquid to gas. The mixture expands to several times its original volume, reaction heat very rapidly causing the closed cell foam to set. Both the time taken for the various stages of the foaming reaction to take place and the nature of the foam obtained can be altered by adjusting the amounts of the constituents used. As the foam material expands to fill the mold 20, it both deforms and permeates into the open cell foam collars 26. Threads of the collars 26 tend to puncture the closed cells so inducing a natural collapse at the boundary of the uncured foam as it presses into the collars. This action represents an inherent pressure valve, the collapsed cells also forming, in effect, a protective skin at the boundary of the foam. Because the foam collars are highly flexible they tend to compact somewhat and to be driven into the conical end zones 24 further relieving pressure within the mold cavity. They are however prevented from exiting the mold 20 by the conical form of the mold wall at the end zones 24. Use of an adaptor collar 26 of highly flexible foam allows multiple cable entry without the use of other adaptors or labour intensive cutting and shaping.

Figure 3:
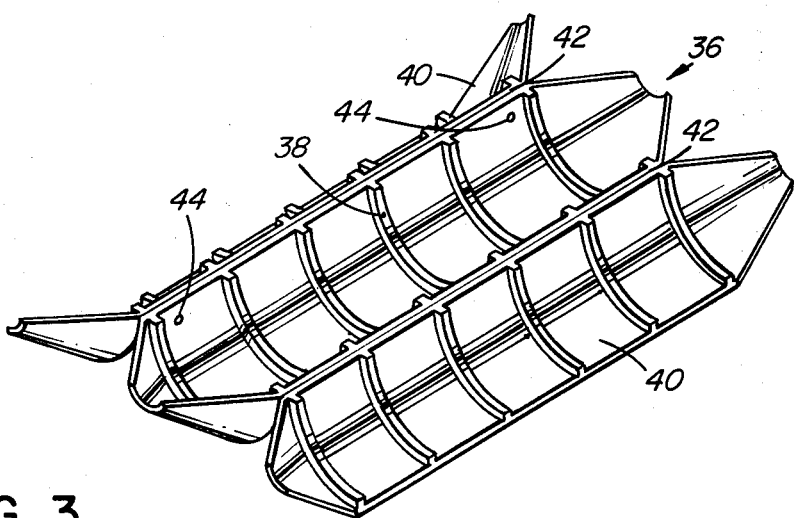
FIG. 3 is a perspective view of an alternative mold housing.

Referring to FIG. 3 an alternative mold shown has a central region 36 of semicircular cross section, this region having strengthening ribs 38. Two arcuate section wing portions 40 are hinged to the central portion at weakened zones 42. In use, the central portion 36 is held under the splice with flexible ties (not shown) anchored at holes 44 punched through the wall of the mold. The ties extend around the splice to leave the mold central portion suspended under the splice. The foam mixture is then poured into the central portion 36, the wing portions 40 folded in and tied into position and the foaming reaction takes place as described previously.

The thermosetting foam used is quite rigid and can take a compressive stress of the order of 15 kg/cm$^2$ without deforming. Most importantly, the foam, being a closed cell material, is inherently waterproof, and adheres to polyethylene so forming an effective waterproof seal with the cable and conductor sheath portions which it contacts.

An advantage of the foam closure is the ease with which the cable joint can be re-entered. There are two methods by which entry can be obtained. In the first, a steel wire lanyard is laid the length of the splice and, except for an end portion, is sealed within the foam during the foaming reaction. Subsequently if access to the joint is required, for example, for repair purposes, then after removing the mold 20, the lanyard is pulled to cut the foam capsule along its length. In the second an azobisisobutyronitrile blowing agent incorporated into a foam decomposes into carbon and nitrogen when the foam is heated by torch to about 250° C. This causes spontaneous rupture of the individual cells, the foam literally exploding away from the underlying splice. The spliced conductors within the joint are easily freed of foam since at the temperature of the foaming reaction, the foam and the grease which coat the various elements do not adhere together. In contrast, the most common thermosetting elastomer used in cable joint enclosures, high density polyethylene, is miscible with grease at the injection temperatures commonly used thus making subsequent cleaning of the individual conductor splices difficult.

It has been estimated that the materials used in foam closures are half the cost of the heatshrink tube and a third of the cost of the necessary amount of thermosetting elastomer for a comparable encapsulating operation. Moreover, foam encapsulating is comparable in installation time with heatshrink and takes considerably less time than potting the splice in a thermosetting elastomer. In fact, the closed joint can be buried or replaced in a duct immediately after the foaming action is complete. As indicated previously the resulting closure is waterproof, durable, re-enterable and is not craft sensitive.

Although the invention has been described only for the application of encapsulating splices between grease filled cables, the technique can be used for encapsulating joints between powder filled cables and between optical fiber cables. Also the encapsulation techniques can be used where the splice is to be aerially suspended or buried.

What is claimed is:

1. A method of encapsulating a telecommunications cable splice between at least two sheathed cables, the splice having a plurality of connectors connecting the cables at unsheathed end portions thereof, the method comprising:
    encapsulating the connectors in a moisture resistant material;
    wrapping the encapsulating connectors with a film material;
    wrapping portions of the cable sheath adjacent to the splice with an open cell highly flexible material;
    suspending a mold under the splice, the mold having a tray member hinged to at least one other member, the hinged members disposed in open mold condition;
    mixing a foam base material with an activating agent and pouring the mixture into the tray member;
    moving the hinged members to a mold closed position such that the mold embraces the splice and truncated conical ends of the mold bear against the wrapped sheath portions; and
    fastening the mold in the closed position preparatory to a foaming reaction taking place between the foam base material and the activating agent.

2. A method as claimed in claim 1 in which the open cell highly flexible material wrapped around said cable sheath portions presents a matrix of threads to an expanding foam resulting from said foaming reaction, the threads operable to puncture closed cells of the expanding foam as the foam penetrates into the open cell material whereby to cause a boundary layer of the expanded foam when solidified to be relatively more dense than an interior part of the expanded foam.

3. A method as claimed in claim 1 in which, to encapsulate the connectors in a moisture resistant material, groups of the connectors are immersed into containers full of grease, the containers then being closed to retain the connectors and grease within the containers.

4. A method as claimed in claim 1 in which the mold is suspended under the splice by ties fixed at one end to the spliced cables and at their other ends to the molds.

5. A telecommunications cable splice closure comprising at least two sheathed cables spliced together by a plurality of connectors connecting the cables at unsheathed portions thereof, the connectors being encapsulated in a moisture impervious material, the encapsulated connectors being surrounded by a wrapping film, the wrapped connectors being closely embraced by a block of closed cell foam plastics, the foam plastics block being contained within a substantially cylindrical mold having truncated conical ends surrounding sheathed portions of the respective cables, the sheathed portions wrapped with an open cell material having a matrix of threads, said block of foam having a boundary region thereof within the wrapped open cell material, the boundary region being relatively more dense than an interior portion of the foam block.

6. A closure as claimed in claim 5 in which the groups of the connectors are encapsulated with grease in sealed bags.

7. A closure as claimed in claim 6 in which the encapsulated connectors are surrounded by a film of polyethylene.

* * * * *